United States Patent [19]

Byrnes et al.

[11] Patent Number: 5,096,380

[45] Date of Patent: Mar. 17, 1992

[54] COMPOSITE FLEXBEAM FOR A BEARINGLESS HELICOPTER ROTOR

[75] Inventors: Francis E. Byrnes, White Plaines, N.Y.; Albert T. Krauss, Harwinton, Conn.

[73] Assignee: United Technology Corporation, Hartford, Conn.

[21] Appl. No.: 518,592

[22] Filed: May 3, 1990

[51] Int. Cl.$^5$ ............................................... B64C 27/33
[52] U.S. Cl. .................................. 416/134 A; 416/141
[58] Field of Search .............. 416/134 A, 138 A, 141, 416/230 A

[56] References Cited

U.S. PATENT DOCUMENTS

| | | | |
|---|---|---|---|
| 3,261,407 | 7/1966 | Culver et al. | 416/134 A |
| 3,797,964 | 3/1974 | Hanson | 416/134 A |
| 4,201,515 | 5/1980 | Derschmidt et al. | 416/134 A |
| 4,273,511 | 6/1981 | Mouille et al. | 416/134 A |
| 4,360,337 | 11/1982 | Frommlet et al. | 416/134 A |
| 4,650,401 | 3/1987 | Yuo et al. | 416/134 A |
| 4,746,272 | 5/1988 | Noehren et al. | 416/134 A |

*Primary Examiner*—Edward K. Look
*Assistant Examiner*—James A. Larson

[57] ABSTRACT

A flexbeam 16 for a bearingless helicoptor rotor includes a composite beam 28, composed of unidirectional fibers bound in an epoxy matrix, having ribs 32, composed of unidirectional fibers bound in a urethane matrix, bonded to each horizontal face at the section of the beam 28 which accommodates lead-lag torsion.

5 Claims, 2 Drawing Sheets

COMPOSITE FLEXBEAM FOR A BEARINGLESS HELICOPTER ROTOR

TECHNICAL FIELD

This invention relates to helicopter rotor systems and more particularly an improved composite flexbeam for a bearingless rotor system.

BACKGROUND ART

The rotor system of a helicopter mounts and supports the helicopter blades to the engine output shaft and includes, among other things, a hub, which is mounted on the output shaft and a set of spindles or yokes, which attach the blades to the hub. The rotor system must withstand the tremendous centrifugal force the blades apply during rotation while permitting their flapping, pitch and lead/lag motions. The many different systems utilized for this task are variations on two basic designs, referred to as articulated and bearingless, or hingeless. The articulated system utilizes a rigid spindle equipped with hinges and bearings to facilitate the aforementioned blade motions. The bearingless system comprises special composite material spindles (referred to as flexbeams) that are flexible enough to twist and bend to allow blade movement without hinges, bearings and additional mechanics. The present invention is directed towards bearingless rotor flexbeams.

A certain minimum cross-section is required for a flexbeam to support centrifugal blade loads and static blade droop loads, while the aforementioned blade movements require the flexbeam to also have considerable torsional flexibility. The flexbeam cannot be too soft in chordwise and flapwise flexibility, though, because significant flapwise blade deformation, or buckling, will occur under normal operating conditions. Tradeoffs, therefore, are to be made between centrifugal loading strength, fatigue strength, torsional flexibility, chordwise and flapwise flexibility. Commonly owned U.S. Pat. No. 4,746,272 (Noehren et al.) discloses a flexbeam system which is indicative of recent designs addressing these tradeoffs. In Noehren et al., four helicopter blades are attached to two unitary composite flexbeams each holding diametrically opposing blades. The cross-section of each flexbeam is tailored along the length to separate the maximum strains into a flap flexure inboard section, a lag-torsion outboard section, and blade and hub attachment sections. The flap flexure section has a rectangular cross-section which tapers in thickness and is designed to accommodate blade flapping motion while the lag-torsion section has several different multiple-lobed H-beam cross-sections designed for lead-lag frequency placement, minimization of the torsion moment caused by blade twist, and minimization of chordwise flexibility.

Although prior flexbeam designs such as disclosed in Noehren et al have improved the usefulness of bearingless rotors, two specific drawbacks impose a significant deterrent to their utilization. One is that complex flexbeam designs such as multiple-lobed H-beams are susceptible to high stress concentrations within the structure, thereby causing a relatively short life span and a reliability problem. The other drawback being that prior flexbeams are difficult and costly to manufacture.

In addition, expanded mission profiles have fostered a demand on helicopters for an expanded flight envelope and increased payload. Reduction of rotor size and weight with increased strength and flexibility certainly help promote this cause. Of course, simplicity is also highly desirable. A new bearingless rotor design which eliminates the previously mentioned drawbacks and satisfies the new requirements is necessitated.

DISCLOSURE OF THE INVENTION

An object of the present invention is to provide for an improved flexbeam which is relatively easy to manufacture.

Another object of the present invention is to provide for an improved flexbeam which avoids high internal stress concentration points.

According to the present invention, a rectangular composite epoxy flexbeam is reinforced by bonding to each horizontal face a tapered, composite urethane rib.

The flexbeam of the present invention is strong in the chordwise direction, yet flexible enough to facilitate required blade movements without increasing control loads. The present invention is easy to inspect for fatigue, thereby reducing maintenance costs. It is also lightweight and very durable.

BEST MODE FOR CARRYING OUT THE INVENTION

Figure 1:
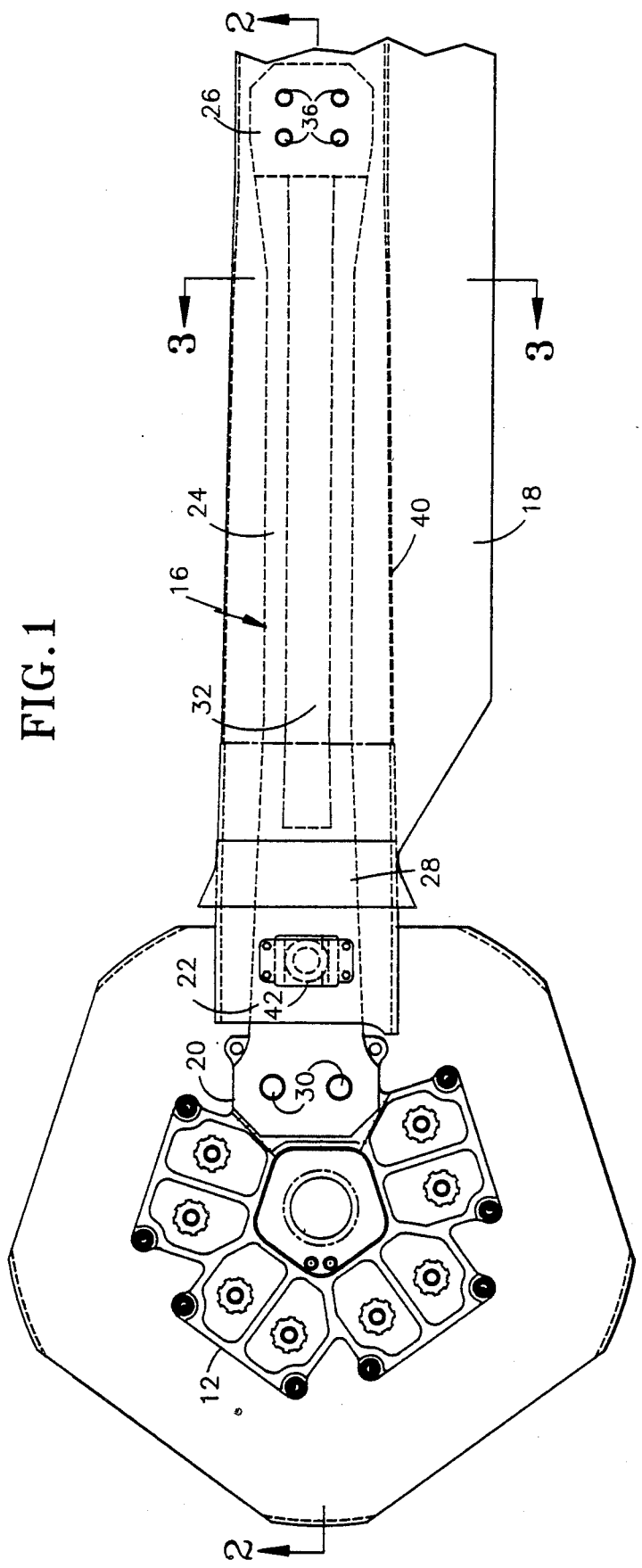
FIG. 1 is a top view of a five blade rotor system showing one blade broken away.

Referring now to FIG. 1, a rotor system of a helicopter includes a hub assembly 12 designed to accommodate five rotor blade systems. For convenience, only one of the five identical blade systems is shown.

A flexbeam assembly 16 connects a helicopter blade 18 to the rotor hub assembly 12 and comprises the following major sections: a hub section 20; an inboard flap flexure section 22; an outboard lag-torsion flexure section 24; and a blade attachment section 26 at the extreme outboard end of the flexbeam assembly 16. The major part of flexbeam assembly 16 consists of a beam 28 of composite fibers (or rovings), such as KEVLAR S-glass, or graphite which are laid up unidirectionally along the length of the flexbeam (radial to the rotor shaft axis) and bound in a toughened matrix of epoxy resin such as the 6376 epoxy available from Ciba-Geigy. The thickness and width of the beam 28 will depend on the characteristics of the aircraft and mission profile. The maximum thickness allowable for the present invention was determined to be 0.3 inches.

The hub section 20 of the epoxy beam 28 is rectangular in cross section (normal to the flexbeam length) and made up of several layers (or plies) of the aforementioned composite fibers, said layers defining vertically stacked planes normal to the rotor shaft axis. Two circular, vertical holes 30 are formed in the hub section 20 and are used for attaching the flexbeam assembly 16 to the hub 12.

The flap flexure section 22 of the epoxy beam 28 is rectangular in cross section (normal to the flexbeam length), tapering in width and thickness from greater at the inboard end where it meets the hub section 20 to lesser at the outboard end where it meets the lag torsion flexure section 24. The relative length of the flap flexure section is approximately 10 percent of the overall blade radius (rotor shaft axis to blade tip).

The lag-torsion section of the flexbeam is characterized by a composite urethane elastomer rib 32 bonded to each of the horizontal faces of the epoxy beam 28. The ribs 32 are largely made up of composite fibers such as S-Glass which are laid up unidirectionally in a urethane matrix and extending longitudinally of the length of the flexbeam assembly 16. The thickness of both ends of the rib 32 is tapered, with the inboard section of the rib being thinnest and increasing to a maximum thickness at approximately 8 percent of the rib length in the outboard direction and remains constant until a point approximately 90 percent along the rib length where it tapers down to the minimum thickness at the outboard end. The tapering of the urethane rib 32 is best shown hereinafter in FIG. 2, and is required to gradually introduce shear loads (from chordwise bending) along the taper into the epoxy beam substrate 28. If the rib were not tapered, high shear load concentration would occur in the epoxy beam at the rib edges. The maximum thickness of the rib depends on the characteristics of the particular aircraft and mission. The maximum thickness allowable for the present invention was determined to be 0.15 inches. The urethane rib has a high strain allowable which improves the shear strain distribution of the flexbeam 28 during twisting and a low shear modulus so as not to increase the torsional stiffness of the flexbeam which would increase pitch control loads. The rib 32 is bonded to the epoxy beam substrate 28 using a suitable adhesive, such as Tycel B2504-72/Tycel 7200 manufactured by the Tycel Corporation.

The blade-attachment section 26 at the extreme outboard end of flexbeam 16 is constructed similarly to the hub attachment section 20 but with four holes 36 for attaching the blade 18.

When torsional forces (pitch control inputs and/or aerodynamic forces) are applied to the blade root end, it is intended that the lag-torsion flexure section 24 of the flexbeam twist predominately in response thereto, and that the flap flexure section 22 twist to a lesser extent. It is also desirable that the lag-torsion flexure section be somewhat flexible inplane so that blade lead/lag activity is accommodated in this section of the flexbeam. Lastly, it is of the utmost importance that the effective hinge offset be concentrated in the inboard flap flexure section of the flexbeam. Effective hinge offset is discussed in detail in commonly owned U.S. Pat. No. 4,323,332 (Fradenburgh, 1982).

The flexbeam assembly 16 is disposed within a protective torque tube 40 and blade 18 in a fashion well known in the prior art. An elastomeric bearing assembly 42 the relative motions between the flexbeam and the torque tube.

Figure 2:
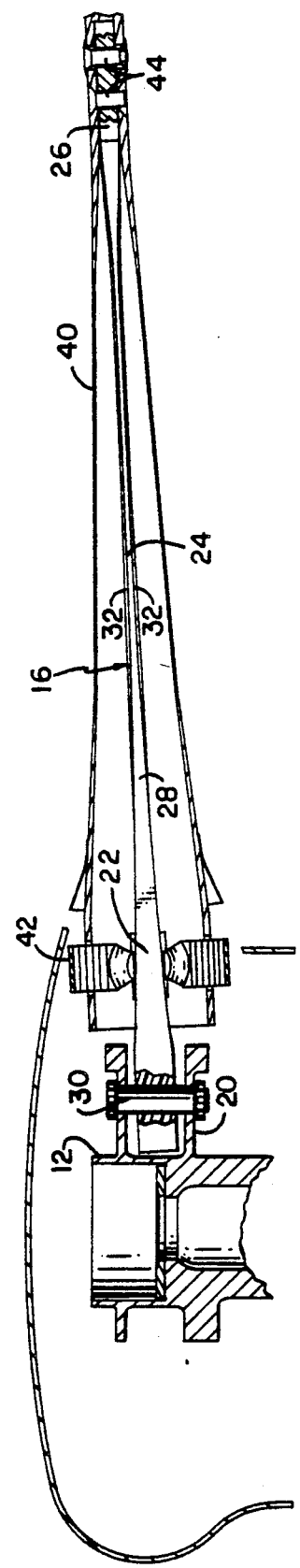
FIG. 2 is a sectional view taken substantially along the line 2—2 of FIG. 1.

Referring now to FIG. 2, composite flexbeam 16 has hub section 20, flap-flexure section 22, lead-lag section 24 and blade-attachment section 26. Composite urethane ribs 32 are bonded to both horizontal faces of the epoxy beam 28 and are tapered in thickness at both inboard and outboard ends. The flexbeam 16 is attached to the rotor hub 12 by pins 42. Pins 44 attach the blade 18 to the flexbeam 16. Elastomeric bearing assembly 42 accommodates the relative motions between the flexbeam and the torque tube.

The particular cross-sectional shape of rib 32 is not required to be rectangular. For instance, it may have a square cross-section for a particular usage. It is important that the ends of rib 32 be tapered, though, in order to reduce the aforementioned shear loading concentration. Also, a ±45 degree fiberglass filament overwrap (not shown) may be used to encapsulate the inboard and outboard tapers of the urethane ribs 32 if interlaminar shear between the ribs 32 and the epoxy beam 28 occurs.

Figure 3:
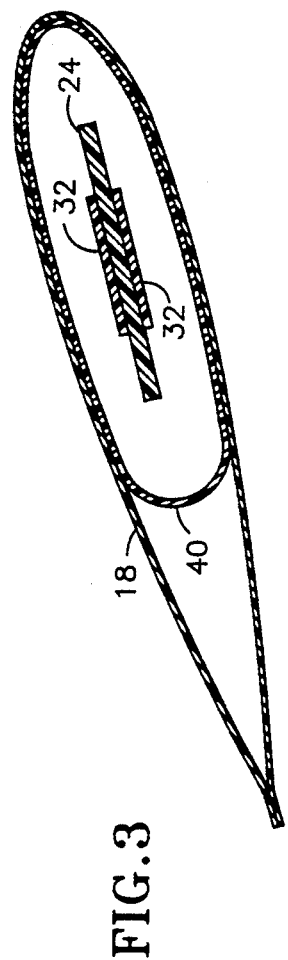
FIG. 3 is a sectional view taken substantially along the line 3—3 of FIG. 1.

Referring now to FIG. 3, urethane ribs 32 are bonded on both horizontal faces of epoxy beam 28. The flexbeam assembly 16 is disposed within torque tube 40 and blade 18.

Although the invention has been shown and described with exemplary embodiments thereof, it should be understood by those skilled in the art that the foregoing and various other changes omissions and additions may be made therein and thereto without departing from the spirit and scope of the invention.

We claim:

1. A flexbeam for a helicopter rotor system comprising:
   a beam of unidirectional composite fibers extending longitudinally along the length of said beam and bound in an epoxy matrix and having two horizontal faces and two vertical faces, a hub section, a flap flexure section outboard of said hub section, a lag-torsion section outboard of said flap flexure section, and a blade attachment section outboard of said lag-torsion section; and
   a rib of unidirectional composite fibers bound in a urethane matrix and extending longitudinally along the length of said rib and longitudinally of said beam and bonded to one of said horizontal faces of said beam at said lag-torsion section.

2. The flexbeam according to claim 1, wherein both of said horizontal faces have a said rib bonded thereto.

3. The flexbeam according to claim 1 wherein said rib is characterized by tapering down in thickness at each end.

4. The flexbeam according to claim 1, wherein said beam has a rectangular cross-section and is characterized by the width and thickness of said beam tapering down through said flap flexure section, staying constant through the majority of said lag-torsion section and tapering up at the outboard end of said lag-torsion section to the blade attachment section.

5. The flexbeam according to claim 2 wherein each said rib is characterized by tapering down in thickness at each end.

* * * * *